(12) United States Patent
Jang et al.

(10) Patent No.: US 9,774,040 B2
(45) Date of Patent: Sep. 26, 2017

(54) SURFACE COATED POSITIVE ELECTRODE ACTIVE MATERIAL, PREPARATION METHOD THEREOF AND LITHIUM SECONDARY BATTERY INCLUDING THE SAME

(71) Applicant: LG Chem, Ltd., Seoul (KR)

(72) Inventors: Wook Jang, Daejeon (KR); Seung Beom Cho, Daejeon (KR); Ick Soon Kwak, Daejeon (KR); Jun Seong Ahn, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/038,844

(22) PCT Filed: Aug. 26, 2015

(86) PCT No.: PCT/KR2015/008914
§ 371 (c)(1),
(2) Date: May 24, 2016

(87) PCT Pub. No.: WO2016/032222
PCT Pub. Date: Mar. 3, 2016

(65) Prior Publication Data
US 2017/0170480 A1    Jun. 15, 2017

(30) Foreign Application Priority Data

Aug. 26, 2014  (KR) .................. 10-2014-0111503
Aug. 21, 2015  (KR) .................. 10-2015-0117753

(51) Int. Cl.
*H01M 4/505* (2010.01)
*H01M 4/62* (2006.01)
(Continued)

(52) U.S. Cl.
CPC ........... *H01M 4/628* (2013.01); *H01M 4/505* (2013.01); *H01M 4/525* (2013.01); *H01M 4/624* (2013.01);
(Continued)

(58) Field of Classification Search
CPC ..................................................... H01M 4/366
See application file for complete search history.

(56) References Cited

U.S. PATENT DOCUMENTS

2001/0053480 A1  12/2001  Koga et al.
2010/0119947 A1   5/2010  Lee et al.
(Continued)

FOREIGN PATENT DOCUMENTS

KR   20060101966 A    9/2006
KR   20110126418 A   11/2011
(Continued)

OTHER PUBLICATIONS

Extended Search Report from European Application No. 15835195.7, dated May 11, 2017.
(Continued)

*Primary Examiner* — James Lee
(74) *Attorney, Agent, or Firm* — Lerner, David, Littenberg, Krumholz & Mentlik, LLP

(57) ABSTRACT

The present invention relates to a surface coated positive electrode active material, a preparation method thereof, and a lithium secondary battery including the same. More specifically, it relates to a positive electrode active material of which surface is coated with a nanofilm including polyimide (PI) and conductive nanoparticles, a preparation method thereof, and a lithium secondary battery including the same. The positive electrode active material of which surface is coated with the nanofilm according to the present invention is capable of preventing direct contact of the positive electrode active material with an electrolyte thereby suppressing a side reaction between the positive electrode active material and the electrolyte, and as a result, a lifespan property of a lithium secondary battery using a positive (Continued)

(a)

(b)

electrode including the same may be significantly improved, and particularly, a lifespan property and conductivity are capable of being enhanced under a high temperature and high voltage condition.

20 Claims, 2 Drawing Sheets

(51) Int. Cl.
    *H01M 4/525*    (2010.01)
    *H01M 10/0525*   (2010.01)
    *H01M 4/02*     (2006.01)

(52) U.S. Cl.
    CPC .. *H01M 10/0525* (2013.01); *H01M 2004/028* (2013.01); *H01M 2220/30* (2013.01)

(56) References Cited

U.S. PATENT DOCUMENTS

| | | | |
|---|---|---|---|
| 2012/0121989 A1 | 5/2012 | Roberts et al. | |
| 2014/0154572 A1* | 6/2014 | Singh ................ | H01M 4/525 429/215 |
| 2015/0017534 A1 | 1/2015 | Miyuki et al. | |

FOREIGN PATENT DOCUMENTS

| | | |
|---|---|---|
| KR | 20140023861 A | 2/2014 |
| TW | 201228071 A | 7/2012 |
| TW | 201424107 A | 6/2014 |
| WO | 2013115219 A1 | 8/2013 |

OTHER PUBLICATIONS

Written Opinion of the International Searching Authority from PCT/KR2015/008914, dated Nov. 26, 2015.

International Search Report from PCT/KR2015/008914, dated Nov. 26, 2016.

Park, Jang-Hoon, "Polyimide gel polymer electrolyte-nanoencapsulated LiCoO2 cathode materials for high-voltage Li-ion batteries." Electrochemistry Communications, 2010, vol. 12, No. 8, pp. 1099-1102.

* cited by examiner (a)  (b)

(a)  (b)

(a)  (b)

SURFACE COATED POSITIVE ELECTRODE ACTIVE MATERIAL, PREPARATION METHOD THEREOF AND LITHIUM SECONDARY BATTERY INCLUDING THE SAME

CROSS-REFERENCE TO RELATED APPLICATION

This application is a national phase entry under 35 U.S.C. §371 of International Application No. PCT/KR2015/008914, filed Aug. 26, 2015, which claims priority to Korean Patent Application No. 10-2014-0111503, filed Aug. 26, 2014 and Korean Patent Application No. 10-2015-0117753, filed Aug. 21, 2015, the disclosures of which are incorporated herein by reference.

TECHNICAL FIELD

The present invention relates to a surface coated positive electrode active material, a preparation method thereof, and a lithium secondary battery including the same, and more particularly, to a positive electrode active material of which surface is coated with a nanofilm including polyimide (PI) and conductive nanoparticles, a preparation method thereof, and a lithium secondary battery including the same.

BACKGROUND ART

Since their appearance in 1991 as a small, light and large capacity battery, lithium secondary batteries have been widely used as a power supply of mobile devices. Recently, with rapid development of electronics, communication and computer industries, camcorders, mobile phones, laptop PCs have appeared and made remarkable progresses, and demands for lithium secondary batteries as a power source driving these mobile electronic information communication devices have increased each day.

Lithium secondary batteries have a problem in that the lifespan rapidly decreases as charge and discharge are repeated.

Such a lifespan decrease is caused by a side reaction between a positive electrode and an electrolyte, and this phenomenon may become more serious under a high voltage and high temperature condition.

Accordingly, development of secondary batteries for a high voltage is required, and to this end, technologies controlling a side reaction between a positive electrode active material and an electrolyte or electrode interfacial reaction are very important.

In order to solve such a problem, a technology of coating a metal oxide including Mg, Al, Co, K, Na, Ca or the like on the surface of a positive electrode active material has been developed.

Particularly, it is generally known that oxides such as $Al_2O_3$, $ZrO_2$, and $AlPO_4$ are capable of being coated on the surface of a positive electrode active material. It is also established that the coating layer enhances stability of the positive electrode active material.

However, in the surface coating using the oxide coating layer, the oxide coating layer adopts a form of being finely dispersed in a nano-sized particle form instead of the oxide coating layer covering an overall surface of a positive electrode active material.

As a result, the surface modification effect of the positive electrode active material by the oxide coating layer is limited. In addition, the oxide coating layer is one type of an ion insulation layer in which lithium ion migration is difficult, and may cause an ion conductivity decrease.

In view of the above, the inventors of the present invention have studied a positive electrode active material capable of exhibiting an excellent lifespan property even under a high voltage condition while having excellent safety, and identified that a surface coated positive electrode active material prepared by forming a nanofilm including polyimide and conductive nanoparticles on the surface of the positive electrode active material may effectively suppress a side reaction between the positive electrode active material and an electrolyte due to the nanofilm, and may exhibit an excellent lifespan property and conductivity even under a high voltage condition while having excellent safety, and completed the present invention.

DISCLOSURE

Technical Problem

The present invention has been made in view of the above, and an embodiment of the present invention is directed to providing a surface coated positive electrode active material having an excellent lifespan property not only under a general voltage condition but particularly under a high temperature and high voltage condition, and having excellent conductivity while having excellent safety, by coating the whole positive electrode active material surface with a nanofilm in which lithium ions are migratable and thereby effectively suppressing a side reaction between the positive electrode active material and an electrolyte.

Another embodiment of the present invention is directed to providing a method for preparing the surface coated positive electrode active material.

Still another embodiment of the present invention is directed to providing a positive electrode including the surface coated positive electrode active material.

Moreover, yet still another embodiment of the present invention provides a lithium secondary battery including the positive electrode, a negative electrode and a separator provided between the positive electrode and the negative electrode.

Technical Solution

An aspect of the present invention provides a surface coated positive electrode active material including a positive electrode active material; and a nanofilm including polyimide (PI) and conductive nanoparticles coated on a surface of the positive electrode active material, wherein the conductive nanoparticles are one or more types selected from the group consisting of antimony tin oxide, indium tin oxide, aluminum zinc oxide and zinc oxide.

In addition, another aspect of the present invention provides a method for preparing a surface coated positive electrode active material, the method including preparing a mixed solution mixing and dispersing conductive nanoparticles into an organic solvent diluting polyamic acid; forming a film including the polyamic acid and the conductive nanoparticles on a surface of a positive electrode active material by dispersing the positive electrode active material into the mixed solution; and imidization reacting the film-formed positive electrode active material, wherein the conductive nanoparticles are one or more types selected from the group consisting of antimony tin oxide, indium tin oxide, aluminum zinc oxide and zinc oxide.

Moreover, still another aspect of the present invention provides a positive electrode including the surface coated positive electrode active material.

Furthermore, yet still another aspect of the present invention provides a lithium secondary battery including the positive electrode, a negative electrode and a separator provided between the positive electrode and the negative electrode.

Advantageous Effects

A surface of a positive electrode active material according to the present invention is coated with a nanofilm including polyimide and conductive nanoparticles, particularly, one or more types of conductive nanoparticles selected from the group consisting of antimony tin oxide, indium tin oxide, aluminum-doped zinc oxide and zinc oxide. Accordingly, direct contact of the positive electrode active material with an electrolyte can be prevented, and a side reaction between the positive electrode active material and the electrolyte can be suppressed.

As a result, a lithium secondary battery using a positive electrode including the positive electrode active material of which surface is coated with the nanofilm according to the present invention has a significantly improved lifespan property, and particularly, has an enhanced lifespan property and conductivity under a high temperature and high voltage condition.

BRIEF DESCRIPTION OF THE DRAWINGS

The accompanying drawings illustrate preferred embodiments of the present invention, and further enlighten technological ideas of the present invention as well as the contents of the invention described above, and therefore, the present invention should not be construed as limited to the embodiments set forth herein.

BEST MODE FOR THE INVENTION

Figure 1:
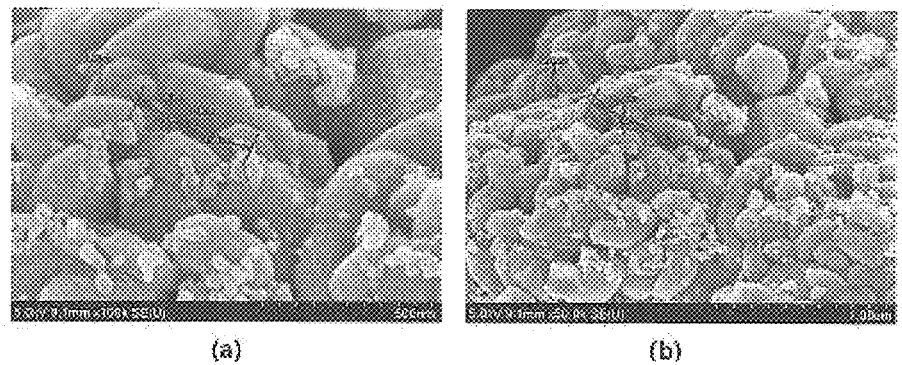
FIG. 1 is an electron micrograph (FE-SEM) result on a surface of a positive electrode active material of which surface is coated with a nanofilm including polyimide and antimony tin oxide that is conductive nanoparticles prepared in Example 1 of the present invention.

Hereinafter, the present invention will be described in detail.

Terms or words used in the present specification and the claims are not to be interpreted limitedly as common or dictionary definitions, and shall be interpreted as meanings and concepts corresponding to technological ideas of the present invention based on a principle in which the inventors may suitably define the concepts of terms in order to describe the invention in the best possible way.

The present invention provides a surface coated positive electrode active material having excellent safety, and having an excellent lifespan property and conductivity under a high temperature and high voltage condition.

The surface coated positive electrode active material according to one embodiment of the present invention includes a positive electrode active material; and a nanofilm including polyimide (PI) and conductive nanoparticles coated on a surface of the positive electrode active material, wherein the conductive nanoparticles are one or more types selected from the group consisting of antimony tin oxide, indium tin oxide, aluminum zinc oxide and zinc oxide.

The nanofilm according to the present invention is a lithium ion migratable film instead of an ion insulation layer such as an inorganic oxide surface coating layer generally known in the art, and the nanofilm may include polyimide (PI) and conductive nanoparticles as described above. By the nanofilm including polyimide (PI), lithium ions may readily migrate, and by including conductive nanoparticles, electron conductivity may be enhanced.

In addition, the nanofilm may surround the whole surface of the positive electrode active material, and by the nanofilm surrounding the positive electrode active material surface, direct contact of the positive electrode active material with an electrolyte may be prevented, and accordingly, a side reaction between the positive electrode active material and the electrolyte may be suppressed. As a result, a lithium secondary battery using a positive electrode including a positive electrode active material of which surface is coated with the nanofilm may have increased safety and an enhanced lifespan property. Particularly, a lifespan property and conductivity may be superior not only under a general voltage condition, but under a high temperature and high voltage condition.

Specifically, polyimide included in the nanofilm may perform a role of a protective film preventing the positive electrode active material being in direct contact with an electrolyte.

The polyimide is a collective term for a polymer having an acid imide structure, and may be obtained from a synthesis using an aromatic anhydride and aromatic diamine In the present invention, the polyimide may be obtained through an imidization reaction using polyamic acid as described later.

In addition, the conductive nanoparticles included in the nanofilm have very excellent electric conductivity and lithium ion conductivity, and may perform a role of providing a path capable of reacting with lithium ions in an electrode, and as a result, are capable of greatly enhancing a lifespan property by uniformly maintaining current and voltage distribution in the electrode during charge-discharge cycles of a lithium secondary battery including a positive electrode active material of which surface is coated with the nanofilm.

Specifically, the conductive nanoparticles according to the present invention may be one or more types selected from the group consisting of antimony tin oxide (ATO), indium tin oxide (ITO), aluminum zinc oxide (AZO) and zinc oxide (ZO) as described above.

The antimony tin oxide represents antimony-doped tin oxide, and may be a compound represented by the following Chemical Formula 1.

$(SnO_2)_a(Sb_2O_4)_b$ [Chemical Formula 1]

In the formula, a:b=85:15 to 97:3.

The indium tin oxide represents indium-doped tin oxide, and may be a compound represented by the following Chemical Formula 2.

$(In_2O_3)_c(SnO_2)_d$ [Chemical Formula 2]

In the formula, c:d=85:15 to 95:5.

The aluminum zinc oxide represents aluminum-doped zinc oxide, and may be a compound represented by the following Chemical Formula 3.

$$(ZnO)_e(Al_2O_3)_f \quad \text{[Chemical Formula 3]}$$

In the formula, e:f=97:3 to 99:1

In addition, the conductive nanoparticles may have an average particle diameter of less than 50 nm, and having a smaller average particle diameter of less than the above-mentioned range may be more advantageous since a specific surface area may increase.

The nanofilm according to the present invention may include the polyimide and the conductive nanoparticles in a weight ratio of 1:0.5 to 10 as described above. When the weight ratio of the polyimide and the conductive nanoparticles is less than 1:0.5, sufficient electric conductivity may be difficult to obtain, and when greater than 1:10, a problem of the conductive nanoparticles being desorbed from the nanofilm may occur.

In addition, the conductive nanoparticles may be included in 0.05% by weight to 5% by weight with respect to 100% by weight of the total surface coated positive electrode active material, and preferably in 0.2% by weight to 2% by weight.

The nanofilm may have a thickness of 1 nm to 200 nm, and preferably 5 nm to 50 nm. When the nanofilm has a thickness of less than 1 nm, an effect of a side reaction between the positive electrode active material and an electrolyte and an effect of an electric conductivity increase due to the nanofilm may be insignificant. In addition, when the nanofilm has a thickness of greater than 200 nm, the thickness of the nanofilm excessively increases becoming an obstacle in lithium ion mobility, and resistance may increase.

The positive electrode active material according to the present invention may be used in a general voltage or high voltage, and may be used without particular limit as long as it is a compound capable of reversibly inserting/desorbing lithium.

Specifically, the positive electrode active material according to one embodiment of the present invention may include a spinel lithium transitional metal oxide having a hexagonal close-packed layered rock salt structure, an olivine structure and a cubic structure with a high capacity property, and in addition to this, any one selected from the group consisting of $V_2O_5$, TiS, and MoS or a complex oxide of two or more types among these.

More specifically, the positive electrode active material may include an oxide of the following Chemical Formula 4 to Chemical Formula 6, and any one selected from the group consisting of $V_2O_5$, TiS and MoS or a mixture of two or more types among these:

$$Li_{1+x}[Ni_aCo_bMn_c]O_2 \ (-0.5 \leq x \leq 0.6,\ 0 \leq a,b,c \leq 1,\ x+a+b+c=1); \quad \text{[Chemical Formula 4]}$$

$$LiMn_{2-x}M_xO_4 \text{(M is one or more elements selected from the group consisting of Ni, Co, Fe, P, S, Zr, Ti and Al, } 0 \leq x \leq 2); \quad \text{[Chemical Formula 5]}$$

$$Li_{1+a}Fe_{1-x}M_x(PO_{4-b})X_b \text{(M is one or more elements selected from the group consisting of Al, Mg, Ni, Co, Mn, Ti, Ga, Cu, V, Nb, Zr, Ce, In, Zn and Y, X is one or more elements selected from the group consisting of F, S and N, and } -0.5 \leq a \leq +0.5,\ 0 \leq x \leq 0.5,\ 0 \leq b \leq 0.1). \quad \text{[Chemical Formula 6]}$$

More specifically, the positive electrode active material may include any one selected from the group consisting of LiCoO$_2$, LiNiO$_2$, LiMnO$_2$, LiMn$_2$O$_4$, Li[Ni$_a$Co$_b$Mn$_c$]O$_2$ (0<a, b, c≤1, a+b+c=1) and LiFePO$_4$, or a mixture of two or more types among these.

In addition, the present invention provides a method for preparing the surface coated positive electrode active material.

A method for preparing the surface coated positive electrode active material according to one embodiment of the present invention includes preparing a mixed solution mixing and dispersing conductive nanoparticles into an organic solvent diluting polyamic acid (step 1); forming a film including the polyamic acid and the conductive nanoparticles on a surface of a positive electrode active material by dispersing the positive electrode active material into the mixed solution (step 2); and imidization reacting the film-formed positive electrode active material (step 3), wherein the conductive nanoparticles are one or more types selected from the group consisting of antimony tin oxide, indium tin oxide, aluminum zinc oxide and zinc oxide.

The step 1 is a step of preparing a mixed solution uniformly dispersing materials forming a nanofilm, and may be carried out by adding, mixing and dispersing conductive nanoparticles into an organic solvent diluting polyamic acid.

In the step 1, a dispersant may be further included in the dispersion when mixing and dispersing the conductive nanoparticles and the organic solvent diluting polyamic acid. The dispersant is not particularly limited as long as it is a compound capable of performing a role of helping the conductive nanoparticles be uniformly dispersed overall in the organic solvent by being mixed to the conductive nanoparticles and the organic solvent diluting polyamic acid, and examples thereof may include a block polymer such as a styrene-butadiene-styrene block polymer (SBS block polymer) or a styrene-butadiene-ethylene-styrene block polymer (SBES block polymer).

In the step 1, mixing and dispersing of the conductive nanoparticles and the organic solvent diluting polyamic acid are normally carried out using a mixer operable at a rotation speed of 10,000 rpm or higher at room temperature (approximately 15° C. to 30° C.). The temperature range and the rotation speed range may be a condition under which a fiber-type carbon material may be smoothly dispersed into an organic solvent diluting polyamic acid, and when the temperature is excessively high, there is concern that the polyimidation reaction converting polyamic acid into polyimide may progress early.

Meanwhile, when each of the conductive nanoparticles and the polyimide is separately coated on the positive electrode active material such that the conductive nanoparticles are first coated or the polyimide is first coated, conductivity network may be secured by coating with the conductive nanoparticles, and contact with an electrolyte may be prevented by coating with the polyimide, however, there is concern that the roles of the conductive nanoparticles and the polyimide may conflict such that, when the conductive nanoparticles are coated inside, conductivity network may not be favorably secured, and when the polyimide is coated inside, the conductive nanoparticles being in contact with an electrolyte may not be prevented.

However, according to the method for preparing a positive electrode active material according to one embodiment of the present invention, a nanofilm in which conductive nanoparticles and polyimide are uniformly dispersed may be formed on a positive electrode active material by carrying out the step 1, and conductivity network may be readily secured therefrom, and a side reaction may be efficiently prevented by performing an excellent role in preventing contact with an electrolyte.

The polyamic acid according to the present invention is a precursor material for forming polyimide included in the nanofilm described above, and may include 4 component polyamic acid.

The 4 component polyamic acid is preferably polyamic acid including pyromellitic dianhydride, biphenyl dianhydride, phenylenediamine and oxydianiline.

In addition, the polyamic acid is not particularly limited, and may be prepared to be used using methods commonly known in the art, or commercially available materials may be purchased to be used. When the polyamic acid is prepared to be used, the polyamic acid may be obtained by reacting an aromatic anhydride and aromatic diamine in a polar aromatic solvent. Herein, the aromatic anhydride and the aromatic diamine may be reacted in the same equivalent.

Specifically, the aromatic anhydride is not particularly limited, and examples thereof may include any one selected from the group consisting of phthalic anhydride, pyromellitic dianhydride, 3,3'4,4'-biphenyltetracarboxylic dianhydride, 4' 4-oxydiphthalic anhydride, 3,3'4,4'-benzophenonetetracarboxylic dianhydride, trimellitic ethylene glycol, 4,4'-(4' 4-isopropylbiphenoxy)biphthalic anhydride and trimellitic anhydride, or a mixture of two or more types among these.

In addition, the aromatic diamine is not particularly limited, and examples thereof may include any one selected from the group consisting of 4,4'-oxydianiline, p-phenyl diamine, 2,2-bis(4-(4-aminophenoxy)-phenyl)propane, p-methylene dianiline, propyltetramethyldisiloxane, polyaromatic amine, 4,4'-diaminodiphenyl sulfone, 2,2'-bis(trifluoromethyl)-4,4'-diaminobiphenyl and 3,5-diamino-1,2,4-triazole, or a mixture of two or more types among these.

The polyamic acid may be used in 0.1% by weight to 1% by weight based on 100% by weight of the organic solvent.

The organic solvent is not particularly limited as long as it is a solvent capable of dissolving the polyamic acid, and examples thereof may include any one selected from the group consisting of cyclohexane, carbon tetrachloride, chloroform, methylene chloride, dimethylformamide, dimethylacetamide and N-methylpyrrolidone, or a mixture of two or more types among these.

In addition, as described above, the conductive nanoparticles according to the present invention may be used in 0.05% by weight to 5% by weight with respect to 100% by weight of the positive electrode active material, and preferably in 0.2% by weight to 2% by weight.

The step 2 is a step of forming a film including the polyamic acid and the conductive nanoparticles on a surface of a positive electrode active material by dispersing the positive electrode active material into the mixed solution prepared in the step 1 in order to form the film on the surface of the positive electrode active material, and may be carried out by adding and uniformly dispersing the positive electrode active material into the mixed solution, and then removing the solvent through heating and concentrating the result.

The dispersion of the positive electrode active material is not particularly limited, and for example, may be carried out by introducing the positive electrode active material to the mixed solution, and then stirring the result for 1 hour or longer using a high speed stirrer.

The step 3 is a step of imidization reacting the positive electrode active material including the film prepared in the step 2 in order to form a positive electrode active material in which a nanofilm is formed on the surface.

The imidization reaction may be carried out by heating the positive electrode active material including the film prepared in the step 2 up to approximately 300° C. to 400° C. with a rate of 3° C./minute at intervals of 50° C. to 100° C., and then maintaining the temperature for 10 minutes to 120 minutes in the range of 300° C. to 400° C. In addition, the temperature may be raised at intervals of 50° C. to 100° C., then maintained for, for example, 10 minutes to 120 minutes, and then raised again. More specifically, the imidization reaction may be progressed by heating the positive electrode active material including the film to 60° C., 120° C., 200° C. 300° C. and 400° C. each with a rate of 3° C./minute, and maintaining the temperature at 60° C. for 30 minutes, at 120° C. for 30 minutes, at 200° C. for 60 minutes, at 300° C. for 60 minutes and at 400° C. for 10 minutes.

Moreover, the present invention provides a positive electrode including the surface coated positive electrode active material.

The positive electrode may be prepared using methods commonly known in the art. For example, a positive electrode may be prepared by preparing positive electrode active material slurry through mixing a solvent, and as necessary, a binder, a conductor, a filler and a dispersant to the surface coated positive electrode active material and stirring the result, then applying (coating) the result on a positive electrode collector, and then compressing and drying the result.

The positive electrode collector may generally use those having a thickness of 3 μm to 500 μm, and any material that is metal to which the positive electrode active material slurry readily adhere, and having high conductivity without causing chemical changes in the corresponding battery may be used. Nonlimiting examples of the positive electrode collector may include copper, stainless steel, aluminum, nickel, titanium, baked carbon or aluminum, or stainless steel of which surface is treated with carbon, nickel, titanium, silver or the like, an aluminum-cadmium alloy, and the like. In addition, in order to bind to the positive electrode active material, those having a form in which a fine unevenness is formed on the surface, or having various forms such as films, sheets, foil, nets, porous materials, foams and non-woven fabrics may be used.

A solvent for forming the positive electrode includes an organic solvent such as N-methylpyrrolidone (NMP), dimethylformamide (DMF), acetone and dimethylacetamide, water, or the like, and these solvents may be used either alone or as a mixture of two or more types. As the amount of the solvent used, an amount capable of dissolving and dispersing the positive electrode active material, a binder and a conductor is sufficient considering the thickness of the applied slurry and the preparation yield.

The binder is a component assisting the binding of the positive electrode active material with a conductor and the binding for the positive electrode collector, and for example, various types of binder polymers such as a polyvinylidene fluoride-hexafluoropropylene copolymer (PVDF-co-HFP), polyvinylidene fluoride, polyacrylonitrile, polymethylmethacrylate, polyvinyl alcohol, carboxymethylcellulose (CMC), starch, hydroxypropylcellulose, regenerated cellulose, polyvinylpyrrolidone, tetrafluoroethylene, polyethylene, polypropylene, polyacrylic acid, an ethylene-propylene-diene monomer (EPDM), a sulfonated EPDM, styrene butadiene rubber (SBR), fluorine rubber, poly acrylic acid, and a polymer substituting hydrogen thereof with Li, Na, Ca or the like, or various copolymers.

The conductor is not particularly limited as long as it has conductivity without causing chemical changes in the corresponding battery, and examples thereof may include graphite such as natural graphite or artificial graphite; carbon black such as carbon black, acetylene black, Ketjen black, channel black, furnace black, lamp black or thermal black; conductive fibers such as carbon fibers or metal fibers; conductive tubes such as carbon nanotubes; metal powder such as fluorocarbon, aluminum or nickel powder; conductive whiskers such as zinc oxide and potassium titanate; conductive metal oxides such as titanium oxide; conductivity materials such as polyphenylene derivatives.

The filler is a component suppressing positive electrode expansion, and the use thereof may be decided as the need arises, and the filler is not particularly limited as a long as it is a fiber material and does not cause chemical changes in the corresponding battery. Examples thereof may include an olefin-based polymer such as polyethylene and polypropylene; and a fiber material such as glass fiber and carbon fiber.

As the dispersant, an aqueous dispersant or an organic dispersant such as N-methyl-2-pyrrolidone may be used.

The coating may be carried out using methods commonly known in the art, and for example, may be carried out by distributing the positive electrode active material slurry on the upper surface of the positive electrode collector, and then uniformly dispersing the slurry using a doctor blade and the like. In addition to this method, methods such as die casting, comma coating and screen printing may be used.

The drying is not particularly limited, but may be carried out for 1 day or less in a vacuum oven at 50° C. to 200° C.

Furthermore, the present invention provides a lithium secondary battery including the positive electrode, a negative electrode and a separator provided between the positive electrode and the negative electrode.

The lithium secondary battery according to one embodiment of the present invention includes the positive electrode including a positive electrode active material of which surface is coated with a nanofilm including polyimide and conductive nanoparticles, a negative electrode, a separator provided between the positive electrode and the negative electrode, and an electrolyte.

In addition, the lithium secondary battery according to one embodiment of the present invention may exhibit an excellent lifespan property both in general voltage and high voltage regions, and particularly, may have a more excellent lifespan property in a high temperature and high voltage region. Specifically, the lithium secondary battery has a charging voltage of 4.2 V to 5.0 V.

The term "general voltage" used in the present specification may mean a region in which a charging voltage of a lithium secondary battery is in a range from 3.0 V and less than 4.2 V, the term "high voltage" may mean a region in which a charging voltage is in a range from 4.2 V to 5.0 V, and the term "high temperature" may mean a range from 45° C. to 65° C.

The negative electrode is not particularly limited, and may be prepared by applying negative electrode active material slurry on an upper surface on one side of a negative electrode collector, and then drying the result, and the negative electrode active material slurry may include additives such as a binder, a conductor, a filler and a dispersant as necessary in addition to a negative electrode active material.

As the negative electrode active material used in the negative electrode according to one embodiment of the present invention, a carbon material capable of absorbing and releasing lithium ions, lithium metal, silicon, tin or the like may be commonly used. A carbon material may be preferably used, and low crystalline carbon and high crystalline carbon may both be used. Low crystalline carbon typically includes soft carbon and hard carbon, and high crystalline carbon typically includes natural graphite, Kish graphite, pyrolytic carbon, mesophase pitch based carbon fiber, meso-carbon microbeads, mesophase pitches, and high-temperature baked carbon such as petroleum or coal tar pitch derived cokes.

The negative electrode collector may be the same as the positive electrode collector described above, or included therein, and additives such as a binder, a conductor, a filler and a dispersant included in the negative electrode may be the same as those used in preparing the positive electrode described above, or included therein.

In addition, the separator may be an insulating thin film having high ion transmittance and mechanical strength, and may generally have a pore diameter of 0.01 µm to 10 µm, and a thickness of 5 µm to 300 µm. As such a separator, a porous polymer film, for example, a porous polymer film prepared from a polyolefin-based polymer such as an ethylene homopolymer, a propylene homopolymer, an ethylene/butene copolymer, an ethylene/hexane copolymer and an ethylene/methacrylate copolymer may be used either alone or as a laminate thereof. Alternatively, common porous non-woven fabrics, for example, non-woven fabrics made of high melting point glass fiber or polyethylene terephthalate fiber may be used, however, the separator is not limited thereto.

The electrolyte used in the present invention may include a lithium salt commonly used in an electrolyte, and is not particularly limited.

An anion of the lithium salt may be one or more selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The electrolyte used in the present invention may include an organic-based liquid electrolyte, an inorganic-based liquid electrolyte, a solid polymer electrolyte, a gel-type polymer electrolyte, a solid inorganic electrolyte, a melting inorganic electrolyte and the like capable of being used in lithium secondary battery preparation, but is not limited thereto.

An appearance of the lithium secondary battery of the present invention is not particularly limited, and may include a cylinder type using a can, a square type, a pouch type, a coin type or the like.

The lithium secondary battery according to the present invention may be used in a battery cell used as a power supply of a small device, and may also be preferably used as a unit battery in a medium to large-sized battery module including a many number of battery cells.

Preferable examples of the medium to large-sized device include electric vehicles, hybrid electric vehicles, plug-in hybrid electric vehicles and power storage systems, however, the device is not limited thereto.

Hereinafter, the present invention will be specifically described with reference to examples. However, examples according to the present invention may be modified to various other forms, and the scope of the present invention is not interpreted to be limited to the examples described below. Examples of the present invention are provided in order to more completely describe the present invention for those having average knowledge in the art.

EXAMPLE

Hereinafter, the present invention will be further described with reference to examples and test examples, however, the present invention is not limited to these examples and test examples.

Preparation Example 1

A mixed solution of polyamic acid and antimony tin oxide was prepared by adding and uniformly dispersing 3 g of antimony tin oxide (ATO) slurry (Advanced Nano Products, Korea) having a 30% solid and an average particle diameter of 27 nm to 20 g of a solution in which polyamic acid is diluted in dimethylacetamide to have a concentration of 0.5% by weight. (polyimide:conductive nanoparticles=1:3)

To the prepared mixed solution, 20 g of $LiNi_{0.6}Mn_{0.2}Co_{0.2}O_2$ particles were introduced as a positive electrode active material, and then the result was stirred for 1 hour using a high speed stirrer. While continuing the stirring, the temperature was raised to the boiling point of the solvent to evaporate the solvent, and as a result, a positive electrode active material of which surface is coated with a film including polyamic acid and antimony tin oxide was prepared.

An imidization reaction was progressed by heating the prepared positive electrode active material of which surface is coated with a film including polyamic acid and antimony tin oxide to 60° C., 120° C., 200° C., 300° C. and 400° C. each with a rate of 3° C./minute, and maintaining the temperature at 60° C. for 30 minutes, at 120° C. for 30 minutes, at 200° C. for 60 minutes, at 300° C. for 60 minutes and at 400° C. for 10 minutes. As the imidization reaction completed, a $LiNi_{0.6}Mn_{0.2}Co_{0.2}O_2$ positive electrode active material of which surface is coated with a nanofilm including polyimide and antimony tin oxide was prepared.

Preparation Example 2

A $LiNi_{0.6}Mn_{0.2}Co_{0.2}O_2$ positive electrode active material of which surface is coated with a nanofilm including polyimide and indium tin oxide was prepared in the same manner as in Preparation Example 1, except that indium tin oxide slurry (Advanced Nano Product) having a 30% solid and an average particle diameter of 30 nm was used instead of the antimony tin oxide slurry.

Preparation Example 3

A $LiNi_{0.6}Mn_{0.2}Co_{0.2}O_2$ positive electrode active material of which surface is coated with a nanofilm including polyimide and aluminum zinc oxide was prepared in the same manner as in Preparation Example 1, except that aluminum zinc oxide slurry (Advanced Nano Product) having a 20% solid and an average particle diameter of 20 nm was used instead of the antimony tin oxide slurry.

Preparation Example 4

A $LiNi_{0.6}Mn_{0.2}Co_{0.2}O_2$ positive electrode active material of which surface is coated with a nanofilm including polyimide and zinc oxide slurry was prepared in the same manner as in Preparation Example 1, except that zinc oxide slurry (Advanced Nano Product) having a 20% solid and an average particle diameter of 25 nm was used instead of the antimony tin oxide slurry.

Preparation Example 5

A $LiNi_{0.6}Mn_{0.2}Co_{0.2}O_2$ positive electrode active material of which surface is coated with a nanofilm was prepared in the same manner as in Preparation Example 1, except that the weight ratio of the polyimide and the conductive nanoparticles in the nanofilm was 1:0.5 by adjusting the concentration of the polyamic acid diluted in the dimethylacetamide, the solution amount, and the added amount of the antimony tin oxide (ATO) slurry (Advanced Nano Products, Korea).

Preparation Example 6

A $LiNi_{0.6}Mn_{0.2}Co_{0.2}O_2$ positive electrode active material of which surface is coated with a nanofilm was prepared in the same manner as in Preparation Example 1, except that the weight ratio of the polyimide and the conductive nanoparticles in the nanofilm was 1:7 by adjusting the concentration of the polyamic acid diluted in the dimethylacetamide, the solution amount, and the added amount of the antimony tin oxide (ATO) slurry (Advanced Nano Products, Korea).

Preparation Example 7

A $LiNi_{0.6}Mn_{0.2}Co_{0.2}O_2$ positive electrode active material of which surface is coated with a nanofilm was prepared in the same manner as in Preparation Example 1, except that the weight ratio of the polyimide and the conductive nanoparticles in the nanofilm was 1:10 by adjusting the concentration of the polyamic acid diluted in the dimethylacetamide, the solution amount, and the added amount of the antimony tin oxide (ATO) slurry (Advanced Nano Products, Korea).

Comparative Preparation Example 1

$LiNi_{0.6}Mn_{0.2}Co_{0.2}O_2$ of which surface is not coated was used.

Comparative Preparation Example 2

A $LiNi_{0.6}Mn_{0.2}Co_{0.2}O_2$ positive electrode active material of which surface is coated with polyimide was prepared in the same manner as in Preparation Example 1 except that the antimony tin oxide slurry in Preparation Example 1 was not added.

Comparative Preparation Example 3

A $LiNi_{0.6}Mn_{0.2}Co_{0.2}O_2$ positive electrode active material of which surface is coated with a nanofilm including polyimide and carbon black was prepared in the same manner as in Preparation Example 1 except that carbon black having an average particle diameter of 30 nm was used instead of the antimony tin oxide slurry.

Comparative Preparation Example 4

A $LiNi_{0.6}Mn_{0.2}Co_{0.2}O_2$ positive electrode active material antimony of which surface is coated with a nanofilm including polyimide and carbon nanotubes was prepared in the same manner as in Preparation Example 1 except that carbon nanotubes were used instead of the antimony tin oxide slurry.

Comparative Preparation Example 5

A $LiNi_{0.6}Mn_{0.2}Co_{0.2}O_2$ positive electrode active material of which surface is coated with a nanofilm was prepared in the same manner as in Preparation Example 1, except that the weight ratio of the polyimide and the conductive nanoparticles in the nanofilm was 1:0.1 by adjusting the concentration of the polyamic acid diluted in the dimethylacetamide, the solution amount, and the added amount of the antimony tin oxide (ATO) slurry (Advanced Nano Products, Korea).

Comparative Preparation Example 6

A $LiNi_{0.6}Mn_{0.2}Co_{0.2}O_2$ positive electrode active material of which surface is coated with a nanofilm was prepared in the same manner as in Preparation Example 1, except that the weight ratio of the polyimide and the conductive nanoparticles in the nanofilm was 1:12 by adjusting the concentration of the polyamic acid diluted in the dimethylacetamide, the solution amount, and the added amount of the antimony tin oxide (ATO) slurry (Advanced Nano Products, Korea).

Example 1

Preparation of Positive Electrode

The surface coated $LiNi_{0.6}Mn_{0.2}Co_{0.2}O_2$ positive electrode active material prepared in Preparation Example 1, carbon black as a conductor, and polyvinylidene fluoride (PVdF) as a binder were mixed in a weight ratio of 95:3:2, and the result was added to an N-methyl-2-pyrrolidone (NMP) solvent to prepare positive electrode active material slurry. The positive electrode active material slurry was applied on an aluminum (Al) thin film, a positive electrode collector, having a thickness of approximately 20 μm, and the result was dried for 2 hours at 130° C. and then roll pressed to prepare a positive electrode.

Preparation of Negative Electrode

Lithium metal foil was used as a negative electrode.

Preparation of Electrolyte

As an electrolyte, a 1M $LiPF_6$ non-aqueous electrolyte was prepared by adding $LiPF_6$ to a non-aqueous electrolyte solvent prepared through mixing ethylene carbonate (EC) and ethylmethyl carbonate (EMC) in a volume ratio of 1:2.

Preparation of Lithium Secondary Battery

After preparing a polymer-type battery through a common method using the prepared positive electrode, the negative electrode and a polyethylene separator (Tonen Chemical Corporation, F2OBHE, thickness=20 μm), and providing an electrolyte and a mixed separator of polypropylene therebetween, the prepared non-aqueous electrolyte was injected thereto to prepare a coin cell-type lithium secondary battery.

Example 2

A lithium secondary battery was prepared in the same manner as in Example 1 except that the positive electrode active material prepared in Preparation Example 2 was used instead of the positive electrode active material prepared in Preparation Example 1.

Example 3

A lithium secondary battery was prepared in the same manner as in Example 1 except that the positive electrode active material prepared in Preparation Example 3 was used instead of the positive electrode active material prepared in Preparation Example 1.

Example 4

A lithium secondary battery was prepared in the same manner as in Example 1 except that the positive electrode active material prepared in Preparation Example 4 was used instead of the positive electrode active material prepared in Preparation Example 1.

Example 5

A lithium secondary battery was prepared in the same manner as in Example 1 except that the positive electrode active material prepared in Preparation Example 5 was used instead of the positive electrode active material prepared in Preparation Example 1.

Example 6

A lithium secondary battery was prepared in the same manner as in Example 1 except that the positive electrode active material prepared in Preparation Example 6 was used instead of the positive electrode active material prepared in Preparation Example 1.

Example 7

A lithium secondary battery was prepared in the same manner as in Example 1 except that the positive electrode active material prepared in Preparation Example 7 was used instead of the positive electrode active material prepared in Preparation Example 1.

Comparative Example 1

A lithium secondary battery was prepared in the same manner as in Example 1 except that the positive electrode active material prepared in Comparative Preparation Example 1 was used instead of the positive electrode active material prepared in Preparation Example 1.

Comparative Example 2

A lithium secondary battery was prepared in the same manner as in Example 1 except that the positive electrode active material prepared in Comparative Preparation Example 2 was used instead of the positive electrode active material prepared in Preparation Example 1.

Comparative Example 3

A lithium secondary battery was prepared in the same manner as in Example 1 except that the positive electrode active material prepared in Comparative Preparation Example 3 was used instead of the positive electrode active material prepared in Preparation Example 1.

Comparative Example 4

A lithium secondary battery was prepared in the same manner as in Example 1 except that the positive electrode active material prepared in Comparative Preparation Example 4 was used instead of the positive electrode active material prepared in Preparation Example 1.

Comparative Example 5

A lithium secondary battery was prepared in the same manner as in Example 1 except that the positive electrode active material prepared in Comparative Preparation Example 5 was used instead of the positive electrode active material prepared in Preparation Example 1.

Comparative Example 6

A lithium secondary battery was prepared in the same manner as in Example 1 except that the positive electrode active material prepared in Comparative Preparation Example 6 was used instead of the positive electrode active material prepared in Preparation Example 1.

Test Example 1

SEM Photomicrograph

Morphology for the positive electrode active materials prepared in Preparation Example 1, and Comparative Preparation Example 1, Comparative Preparation Example 2 and Comparative Preparation Example 4 was analyzed using an electron microscope (FE-SEM). The results are shown in FIG. 1 to FIG. 4, respectively.

When specifically examined, FIG. 1 is the result observing a surface of the $LiNi_{0.6}Mn_{0.2}Co_{0.2}O_2$ particles in which the surface is coated with the nanofilm including polyimide and antimony tin oxide prepared in Example 1 of the present invention, and it can be seen that a nanofilm having a few nanometer thickness, in which the polyimide and the antimony tin oxide that is conductive nanoparticles were well dispersed, was formed on the coated $LiNi_{0.6}Mn_{0.2}Co_{0.2}O_2$ particle surface.

Figure 2:
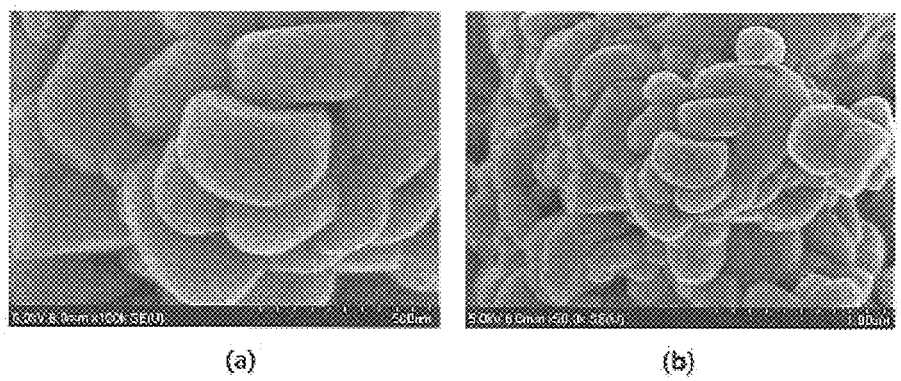
FIG. 2 is an electron micrograph (FE-SEM) result on a surface of a positive electrode active material of which surface is not coated prepared in Comparative Example 1.
Figure 3:
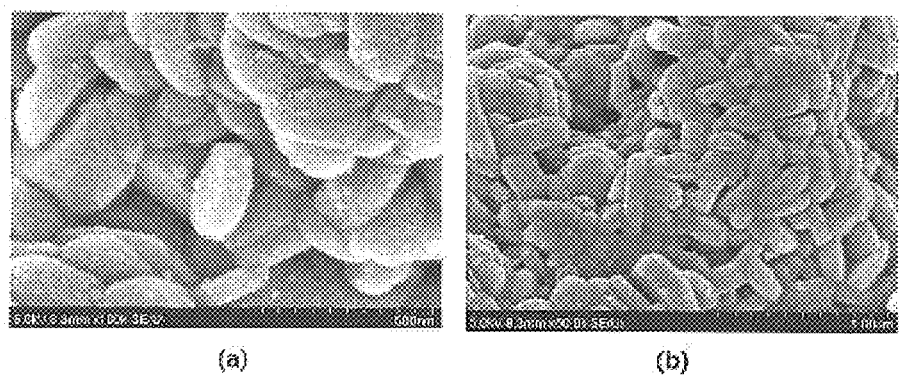
FIG. 3 is an electron micrograph (FE-SEM) result on a surface of a positive electrode active material of which surface is coated with polyimide prepared in Comparative Example 2.

FIG. 2 shows the $LiNi_{0.6}Mn_{0.2}Co_{0.2}O_2$ particles of Comparative Preparation Example 1, which are pure $LiNi_{0.6}Mn_{0.2}Co_{0.2}O_2$ particles of which surface is not coated, and a coating layer was not present on the surface, and FIG. 3 shows the $LiNi_{0.6}Mn_{0.2}Co_{0.2}O_2$ particles of which surface is coated with polyimide prepared in Comparative Preparation Example 2, and the formation of a polyimide coating layer was observed.

Figure 4:
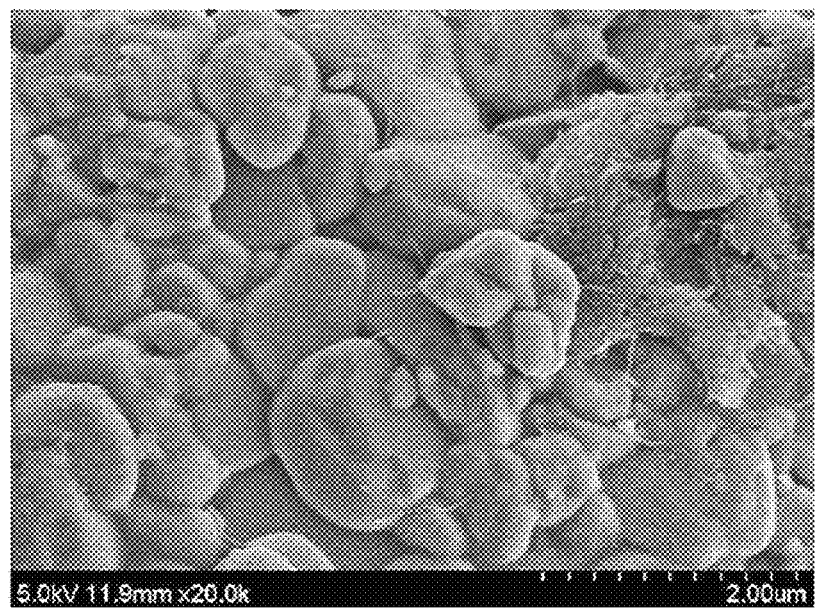
FIG. 4 is an electron micrograph (FE-SEM) result on a surface of a positive electrode active material of which surface is coated with polyimide and carbon nanotubes prepared in Comparative Preparation Example 4.

In addition, FIG. 4 shows the $LiNi_{0.6}Mn_{0.2}Co_{0.2}O_2$ particles of which surface is coated with polyimide and carbon nanotubes prepared in Comparative Preparation Example 4, and it was observed that the carbon nanotubes were agglomerated instead of being uniformly dispersed.

Test Example 2

Evaluation on Charging and Discharging Capacity and Efficiency Property Depending on Materials In order to comparatively evaluate charging and discharging capacity and an efficiency property of each lithium secondary battery prepared in Examples 1 to 4 and Comparative Examples 1 to 4, each of the lithium secondary batteries (battery capacity 4.3 mAh) was charged and discharged with 0.5 C in a voltage section of 3 V to 4.4 V at 45° C. A C-rate is a ratio of capacity when discharging the battery that was charged with 0.5 C with 0.1 C and capacity when discharging with 2 C as shown in the following Mathematical Equation:

$$C\text{-rate} = (\text{Capacity Value When Discharging With 2 C})/(\text{Capacity Value When Discharging With 0.1 C}) \quad \text{[Mathematical Equation 1]}$$

TABLE 1

| Category | Nanofilm | First Charging Capacity (mAh/g) | First Discharging Capacity (mAh/g) | First Efficiency (%) | C-rate (%) | $50^{th}$ Capacity Retention Rate (%) |
|---|---|---|---|---|---|---|
| Example 1 | PI + ATO | 213 | 202 | 94.8 | 92.1 | 95 |
| Example 2 | PI + ITO | 213 | 202 | 94.8 | 92.1 | 95 |
| Example 3 | PI + AZO | 211 | 200 | 94.8 | 91.9 | 95 |
| Example 4 | PI + ZO | 212 | 201 | 94.8 | 92.0 | 95 |
| Comparative Example 1 | — | 212 | 201 | 94.8 | 92.0 | 80 |
| Comparative Example 2 | PI | 214 | 202 | 94.8 | 85.0 | 90 |
| Comparative Example 3 | PI + CB | 212 | 201 | 94.8 | 90.0 | 90 |
| Comparative Example 4 | PI + CNT | 212 | 201 | 94.8 | 90.0 | 90 |

As can be seen from Table 1, it was identified that the lithium secondary batteries of Examples 1 to 4 had similar initial charging and discharging capacity but had significantly more excellent rate determining property (C-rate) and $50^{th}$ capacity retention rate compared to the lithium secondary batteries of Comparative Example 1 to Comparative Example 4.

When specifically examined, it was identified that the lithium secondary batteries of Example 1 to Example 4 according to the present invention had a similar rate determining property but had a significantly more excellent $50^{th}$ capacity retention rate compared to the lithium secondary battery of Comparative Example 1 including a positive electrode active material of which surface is not coated, and had significantly more excellent $50^{th}$ capacity retention rate and rate determining property compared to the lithium secondary battery of Comparative Example 2 including a positive electrode active material of which surface is coated with polyimide only.

In addition, the lithium secondary batteries of Example 1 to Example 4 including a positive electrode active material according to the present invention exhibited a little more excellent rate determining property and a significantly more excellent 50th capacity retention rate compared to the lithium secondary battery of Comparative Example 3 of which surface is coated with polyimide and carbon black, and to the lithium secondary battery of Comparative Example 4 of which surface is coated with polyimide and carbon nanotubes.

Accordingly, it was identified that performances of the lithium secondary batteries of Examples 1 to 4 were generally improved compared to performances of the lithium secondary batteries of Comparative Examples 1 to 4.

Test Example 3

Evaluation on Charging and Discharging Capacity and Efficiency Property Depending on Content In order to comparatively evaluate charging and discharging capacity and an efficiency property of each lithium secondary battery prepared in Examples 1, 5 to 7 and Comparative Examples 5 and 6, the same method as in Test Example 2 was used, and the results are shown in the following Table 2.

TABLE 2

| Category | Nanofilm (PI:N.P.) | First Charging Capacity (mAh/g) | First Discharging Capacity (mAh/g) | First Efficiency (%) | C-rate (%) | 50th Capacity Retention Rate (%) |
|---|---|---|---|---|---|---|
| Example 1 | 1:3 | 213 | 202 | 94.8 | 92.1 | 95 |
| Example 5 | 1:0.5 | 213 | 202 | 94.8 | 91.8 | 95 |
| Example 6 | 1:7 | 213 | 202 | 94.8 | 92.3 | 95 |
| Example 7 | 1:10 | 213 | 202 | 94.8 | 93.0 | 95 |
| Comparative Example 5 | 1:0.1 | 213 | 202 | 94.8 | 86 | 90 |
| Comparative Example 6 | 1:13 | 213 | 202 | 94.8 | 92 | 85 |

As can be seen from Table 2, the lithium secondary batteries of Examples 1, 5 to 7 had similar initial charging and discharging capacity compared to the lithium secondary batteries of Comparative Examples 5 and 6, which identified that a mixing weight ratio of polyimide and conductive nanoparticles in the nanofilm is not a factor affecting capacity, however it was identified that a rate determining property (C-rate) and a 50th capacity retention rate were significantly more excellent.

Through the results shown above, it was identified that the lithium secondary batteries of Examples 1, 5 to 7 according to the present invention, and the lithium secondary batteries of Comparative Examples 5 and 6 having a lower or higher mixing weight ratio of polyimide and conductive nanoparticles included in the nanofilm had significantly different performances in a rate determining property and a 50th capacity retention rate.

Accordingly, it was identified that performances of the lithium secondary batteries of Examples 1, 5 to 7 were generally improved compared to performances of the lithium secondary batteries of Comparative Examples 5 and 6.

The invention claimed is:
1. A surface coated positive electrode active material comprising:
a positive electrode active material; and
a nanofilm on a surface of the positive electrode active material,
wherein the nanofilm includes polyimide (PI) and conductive nanoparticles, and
wherein the conductive nanoparticles are one or more types selected from the group consisting of antimony tin oxide, indium tin oxide, aluminum zinc oxide and zinc oxide.

2. The surface coated positive electrode active material of claim 1, wherein the nanofilm includes the polyimide and the conductive nanoparticles in a weight ratio of 1:0.5 to 1:10.

3. The surface coated positive electrode active material of claim 1, wherein the antimony tin oxide is a compound represented by the following Chemical Formula 1:

$$(SnO_2)_a(Sb_2O_4)_b \qquad \text{[Chemical Formula 1]}$$

wherein, in the formula, a:b=85:15 to 97:3.

4. The surface coated positive electrode active material of claim 1, wherein the indium tin oxide is a compound represented by the following Chemical Formula 2:

$$(In_2O_3)_c(SnO_2)_d \qquad \text{[Chemical Formula 2]}$$

wherein, in the formula, c:d=85:15 to 95:5.

5. The surface coated positive electrode active material of claim 1, wherein the aluminum zinc oxide is a compound represented by the following Chemical Formula 3:

$$(ZnO)_e(Al_2O_3)_f \qquad \text{[Chemical Formula 3]}$$

wherein, in the formula, e:f=97:3 to 99:1.

6. The surface coated positive electrode active material of claim 1, wherein the conductive nanoparticles have an average particle diameter of less than 50 nm.

7. The surface coated positive electrode active material of claim 1, wherein the nanofilm has a thickness range from 1 nm to 200 nm.

8. The surface coated positive electrode active material of claim 1, wherein content of the conductive nanoparticles is from 0.05% by weight to 5% by weight with respect to 100% by weight of the total surface coated positive electrode active material.

9. The surface coated positive electrode active material of claim 1, wherein the positive electrode active material is any one selected from the group consisting of an oxide of the following Chemical Formula 4 to Chemical Formula 6, $V_2O_5$, TiS and MoS, or a mixture of two or more types among these:

$$Li_{1+x}[Ni_aCo_bMn_c]O_2 \qquad \text{[Chemical Formula 4]}$$

($-0.5 \leq x \leq 0.6$, $0 \leq a, b, c \leq 1$, $x+a+b+c=1$);

$$LiMn_{2-x}M_xO_4 \qquad \text{[Chemical Formula 5]}$$

(M is one or more elements selected from the group consisting of Ni, Co, Fe, P, S, Zr, Ti and Al, $0 \leq x \leq 2$);

$$Li_{1+a}Fe_{1-x}M_x(PO_{4-b})X_b \qquad \text{[Chemical Formula 6]}$$

(M is one or more elements selected from the group consisting of Al, Mg, Ni, Co, Mn, Ti, Ga, Cu, V, Nb, Zr, Ce, In, Zn and Y, X is one or more elements selected from the group consisting of F, S and N, $-0.5 \leq a \leq +0.5$, $0 \leq x \leq 0.5$, $0 \leq b \leq 0.1$).

10. The surface coated positive electrode active material of claim 9, wherein the positive electrode active material is any one selected from the group consisting of $LiCoO_2$, $LiNiO_2$, $LiMnO_2$, $LiMn_2O_4$, $Li[Ni_aCo_bMn_c]O_2(0<a, b, c \leq 1, a+b+c=1)$ and $LiFePO_4$, or a mixture of two or more types among these.

11. A method for preparing a surface coated positive electrode active material of claim 1 comprising:
   preparing a mixed solution mixing and dispersing conductive nanoparticles into an organic solvent diluting polyamic acid;
   forming a film including the polyamic acid and the conductive nanoparticles on a surface of a positive electrode active material by dispersing the positive electrode active material into the mixed solution; and
   imidization reacting the film-formed positive electrode active material,
   wherein the conductive nanoparticles are one or more types selected from the group consisting of antimony tin oxide, indium tin oxide, aluminum zinc oxide and zinc oxide.

12. The method for preparing a surface coated positive electrode active material of claim 11, wherein the imidization reaction is carried out while raising the temperature up to 300° C. to 400° C. with a rate of 3° C/minute at intervals of 50° C. to 100° C.

13. The method for preparing a surface coated positive electrode active material of claim 12, wherein the imidization reaction further includes maintaining the temperature for 10 minutes to 120minutes in a range of 300° C. To400° C. after raising the temperature.

14. The method for preparing a surface coated positive electrode active material of claim 11, wherein the polyamic acid is used in an amount from 0.1% by weight to 1% by weight based on 100% by weight of the organic solvent.

15. The method for preparing a surface coated positive electrode active material of claim 11, wherein the polyamic acid is prepared by reacting an aromatic anhydride and diamine in the same equivalent.

16. The method for preparing a surface coated positive electrode active material of claim 15, wherein the aromatic anhydride is any one selected from the group consisting of phthalic anhydride, pyromellitic dianhydride, 3,3'4,4'-biphenyltetracarboxylic dianhydride,4'4-oxydiphthalic anhydride, 3,3'4,4'-benzophenonetetracarboxylic dianhydride, trimellitic ethylene glycol,4,4'-(4'4-isopropylbiphenoxy)biphthalic anhydride and trimellitic anhydride, or a mixture of two or more types among these.

17. The method for preparing a surface coated positive electrode active material of claim 15, wherein the diamine is any one selected from the group consisting of 4,4'-oxydianiline, p-phenyl diamine, 2,2-bis(4-(4-aminophenoxy)-phenyl)propane, p-methylene dianiline, propyltetramethyldisiloxane, polyaromatic amine, 4,4'-diaminodiphenyl sulfone, 2,2'-bis(trifluoromethyl)-4,4'-diaminobiphenyl and 3,5-diamino-1,2,4-triazole, or a mixture of two or more types among these.

18. The method for preparing a surface coated positive electrode active material of claim 11, wherein the polyamic acid includes 4 component polyamic acid.

19. The method for preparing a surface coated positive electrode active material of claim 18, wherein the 4 component polyamic acid is polyamic acid including pyromellitic dianhydride, biphenyl dianhydride, phenylenediamine and oxydianiline.

20. The method for preparing a surface coated positive electrode active material of claim 11, wherein the organic solvent is selected from the group consisting of cyclohexane, carbon tetrachloride, chloroform, methylene chloride, dimethylformamide, dimethylacetamide and N-methylpyrrolidone, or a mixture of two or more types among these.

* * * * *